US011642680B2

(12) United States Patent
Tronrud et al.

(10) Patent No.: US 11,642,680 B2
(45) Date of Patent: May 9, 2023

(54) METHOD AND APPARATUS FOR CONTROLLING A FOCUS POINT OF A STATIONARY BEAM FOCUSING ON A SAMPLE IN A ROTATING CARTRIDGE PLACED IN A ROTATING DISC (71) Applicant: SpinChip Diagnostics AS, Oslo (NO)

(72) Inventors: Ole Christian Tronrud, Sokna (NO); Rolf Jahren, Oslo (NO); Sebastian Stenmark, Oslo (NO); Stig Morten Borch, Oslo (NO)

(73) Assignee: SpinChip Diagnostics AS, Oslo (NO)

( * ) Notice: Subject to any disclaimer, the term of this patent is extended or adjusted under 35 U.S.C. 154(b) by 434 days.

(21) Appl. No.: 16/761,459

(22) PCT Filed: Nov. 5, 2018

(86) PCT No.: PCT/EP2018/080079
§ 371 (c)(1),
(2) Date: May 4, 2020

(87) PCT Pub. No.: WO2019/091880
PCT Pub. Date: May 16, 2019

(65) Prior Publication Data
US 2020/0393478 A1 Dec. 17, 2020

(30) Foreign Application Priority Data
Nov. 9, 2017 (NO) ..................... 20171780

(51) Int. Cl.
*G01N 35/04* (2006.01)
*B01L 3/00* (2006.01)
(Continued)

(52) U.S. Cl.
CPC .......... *B04B 13/00* (2013.01); *B01L 3/50273* (2013.01); *B01L 3/502715* (2013.01);
(Continued)

(58) Field of Classification Search
CPC .. B04B 13/00; B04B 5/02; G01N 2021/7773; G01N 2035/0491; G01N 21/07;
(Continued)

(56) References Cited

U.S. PATENT DOCUMENTS

| 4,883,763 A | 11/1989 | Holen et al. |
| 2003/0082075 A1 | 5/2003 | Agren |

(Continued)

FOREIGN PATENT DOCUMENTS

| CN | 101971035 A | 2/2011 |
| CN | 102119212 A | 7/2011 |

(Continued)

OTHER PUBLICATIONS

Notification of Grant of Patent for Invention and Search Report dated Jan. 26, 2022, directed to CN Application No. 201880072375.5; 8 pages.

(Continued)

*Primary Examiner* — Dean Kwak
(74) *Attorney, Agent, or Firm* — Morrison & Foerster LLP (57) ABSTRACT Provided are methods and apparatuses for controlling a position of a target point on a processing result relative to a focus point of a focusing sensor system for determining properties of the processing result. The method includes the steps of determining an initial focus point of the focusing sensor system, controlling rotation of the cartridge and disc, checking whether the initial focus point of the focusing sensor system corresponds to the target point on the processing result, comparing (x, y) target positions in captured images with the initial focus point of the focusing sensor system, adjusting rotation of the cartridge and disc such that the focus point of the focusing sensor system corresponds to the target point on the processing result, and detecting and (Continued)

examining signals received from the focusing sensor system for determining properties of the processing result.

7 Claims, 4 Drawing Sheets

(51) Int. Cl.
*B04B 5/02* (2006.01)
*B04B 13/00* (2006.01)
*G01N 21/07* (2006.01)
*G01N 35/00* (2006.01)

(52) U.S. Cl.
CPC .............. *B04B 5/02* (2013.01); *G01N 21/07* (2013.01); *G01N 35/00069* (2013.01); *G01N 35/04* (2013.01); *B01L 2200/0647* (2013.01); *B01L 2200/143* (2013.01); *B01L 2300/0803* (2013.01); *B01L 2400/0409* (2013.01); *G01N 2035/0491* (2013.01); *G01N 2201/06113* (2013.01); *G01N 2201/1087* (2013.01)

(58) Field of Classification Search
CPC .............. G01N 21/39; G01N 21/7703; G01N 21/7746; G01N 2201/06113; G01N 2201/1087; G01N 35/00069; G01N 35/04; B01L 3/502715; B01L 3/50273; B01L 2200/0647; B01L 2200/143; B01L 2300/0803; B01L 2400/0409
See application file for complete search history.

(56) References Cited

U.S. PATENT DOCUMENTS

| | | | |
|---|---|---|---|
| 2010/0027110 A1 | 2/2010 | Ikeda et al. | |
| 2010/0297659 A1 | 11/2010 | Yoo | |
| 2011/0093207 A1 | 4/2011 | Ingber et al. | |
| 2012/0293796 A1 | 11/2012 | Ludowise et al. | |
| 2012/0301972 A1* | 11/2012 | Borch | B04B 9/10 422/533 |
| 2014/0045668 A1 | 2/2014 | Case et al. | |
| 2014/0057771 A1 | 2/2014 | Case et al. | |
| 2014/0334267 A1 | 11/2014 | Ho et al. | |
| 2017/0284998 A1 | 10/2017 | Filipe Pinto Silva | |
| 2017/0292967 A1 | 10/2017 | Kim et al. | |

FOREIGN PATENT DOCUMENTS

| | | |
|---|---|---|
| CN | 104142608 A | 11/2014 |
| CN | 105170203 A | 12/2015 |
| CN | 105688302 A | 6/2016 |
| CN | 106053867 A | 10/2016 |
| CN | 106573256 A | 4/2017 |
| CN | 107271703 A | 10/2017 |
| CN | 110152089 A | 8/2019 |
| WO | 03/083491 A2 | 10/2003 |
| WO | 2011/081531 A1 | 7/2011 |

OTHER PUBLICATIONS

Notification of the First Office Action dated Jun. 3, 2021, directed to CN Application No. 201880072375.5; 12 pages.
International Search Report and Written Opinion dated Feb. 13, 2019, directed to PCT Application No. PCT/EP2018/080079; 14 pages.
Norwegian Search Report dated Jun. 7, 2018, directed to NO Application No. 20171780; 2 pages.

* cited by examiner

METHOD AND APPARATUS FOR CONTROLLING A FOCUS POINT OF A STATIONARY BEAM FOCUSING ON A SAMPLE IN A ROTATING CARTRIDGE PLACED IN A ROTATING DISC

CROSS-REFERENCE TO RELATED APPLICATIONS

This application is a U.S. National Phase patent application of PCT/EP2018/080079, filed Nov. 5, 2018, which claims priority to Norwegian Patent Application No. 20171780, filed Nov. 9, 2017, the entire contents of each of which are incorporated herein by reference.

FIELD OF THE DISCLOSURE

The present invention relates to the field of centrifuge apparatuses for processing samples in cartridges, and more specifically to a method and apparatus for controlling a focus point of a measurement system focusing on and analysing a processing result in a cartridge.

BACKGROUND OF THE DISCLOSURE

Centrifuge apparatuses for processing samples in cartridges by centrifugation are well known and are an integral part of chemical and biochemical protocols. Processing is performed by accelerating samples for performing sedimentation of cells, particles and precipitates and separation of liquids or cells with different density.

Dual axis centrifugation is generally obtained in an apparatus that performs rotation of a cartridge around its axis, while the cartridge is being rotated by separate means around a distal axis.

WO 2011/081531 A1 (Borch et al.) describes an example of such a system where a dual axis centrifugation apparatus for a sample processing device is disclosed. A cartridge which is a processing device for a sample is arranged in holding means in a device rotating around its own axis. This device is installed in a bigger rotating device or disc. By means of mechanical transmission devices, controllers and motors, rotation speed of each rotating device is individually controlled. The cartridge can then be rotated around its own axis as well as around a distal axis.

After a sample is placed and secured in a cartridge it will undergo a sequence of controlled rotations around its axis and a distal axis thereby, by means of centrifugal forces, leading the liquid sample and liquid reagents to flow in controlled directions into different channels and microfluidic cavities in the cartridge. These channels and microfluidic cavities will typically process different fluidic reagents which are brought in contact with the sample during a centrifugation process.

When a sample has been exposed to centrifugation and different fluidic reagents, a processing result needs to be examined for determining different properties. There are different ways of doing this.

US 2003082075 A1 (Agren Tomas et al.) describes another detector arrangement with rotary drive in an instrument for analysis of microscale liquid sample volumes. This is however a single axis centrifugation apparatus. A detector arrangement is contemplated for scanning the liquid sample volumes that are contained in a disc shaped substrate having microfluidic structures formed therein for the flow control of the liquid volumes by centrifugal force. The arrangement comprises a detector controlled and guided for linear displacement and positioning in a first plane. A drive unit is operable for incrementally changing the position of the detector in said first radial plane for successively scanning radially adjacent portions of each microcavity arranged on the spinning disc.

A common method of analyzing for a certain substance or analyte involves the use of a solid phase which will selectively bind to the target substance or analyte which typically is a biomarker. In some assays, a solid phase may on its surface carry and display specific capturing molecules which will specifically bind the biomarker. To detect and quantify said biomarker, the solid phase-biomarker complex may also react with another set of biomarker specific binding molecules attached to one or more tracer substances forming a solid phase-biomarker-tracer complex. In other assays, such as competitive immunoassays, the biomarker in the sample will compete with a defined amount of biomarker carrying the tracer substance in the binding to the solid phase. There are numerous ways of arranging and using the involved specific binders and target analytes, including various types of solid phase materials and tracer substances.

One way of examining a processing result is to direct a light source towards the cartridge and use a camera for imaging resulting light transmitted through the cartridge or light reflected from a processing result inside a cartridge. The light source may for instance be a strobe light source adapted to emit strobe light, or it may be a regular light source adapted to emit continuous light. A strobe light source is a device used to produce flashes of light. The duration of each such flash can be very short, typically a few microseconds. The frequency of the flashes generated by the strobe can be linked, directly or indirectly, to the rotation of a cartridge. A flash may thus be controlled to appear periodically when the cartridge is at a defined position or angle. By keeping the shutter of a camera open, an image will be exposed each time light is emitted from the strobe light source.

Any material, structure or surface that absorb, scatter or radiate light may be detected, imaged and/or measured.

A camera may be arranged to see a complete cartridge to follow transportations of liquid throughout the cartridge. It may also be arranged to focus on only a part of a processing result in a cartridge.

The camera can have various uses, including taking pictures or videos of the cartridges and their contents, for detecting a cartridge ID (e.g. a bar code on the cartridge), the contents of the cartridge, errors, fluidic transportations within the cartridge, optical density, colour analysis, etc.

In addition to a camera, other means for detecting properties of a processing result in a cartridge can be used. This may for instance be a photodiode, a photomultiplier, avalanche diode, multi photon pixel counters or similar, and the light source may be the above-mentioned strobe light source or lasers. In addition to detection of light, other properties can be detected by for instance using acoustic, magnetic or radioactive sensors.

The tracer used can be any type of substance that may be detected and measured by either optical, chemical, electrical, magnetic, radioactive means or combinations thereof. Further, the tracer substance may also be formulated as or associated with a particle. Such particles frequently used and detected by optical means includes metal colloids (gold, silver, iron and others), quantum dots, polymer (latex) particles containing or carrying dyes or fluorochromes, polymer, silica or other particles carrying signal generating molecules including enzymes or inorganic crystals such as up-conversion nanoparticles (UCNPs). The particles used as tracer substances or carriers are usually in the nanometer range typically between 2 nm to 200 nm, but larger particles up to 100 μm may be used in some settings. The biomarker specific molecules attached respectively to the solid phase and the tracer substances may for example be antibodies that will specifically bind to the target biomarker, which is then referred to as the antigen. Alternatives to antibodies includes nucleic acid probes, avidin/streptavidin, lectins and aptamers as well as any (bio)receptor that will recognize and specifically bind to defined molecular structures of the ligand (i.e. the analyte or part of the analyte). A major part of all proteins within nature interact more or less specifically with some ligand which may be a defined structure of a large molecule or small molecules. Usually, the more specific and the higher the affinity the binding is the more suited the receptor ligand system is for designing analytical assays.

To quantify a solid phase-biomarker-tracer substance complex, the tracer substance must display certain properties allowing identification and measurement. Optical read-out systems are often particularly convenient as the detector may be placed outside the assaying device. Properties of optical tracer substances include light absorption, light scattering as measured by transmittance or reflectance as well as light diffraction and luminescent phenomena like chemoluminescence, fluorescence, up-conversion phosphorescence and others including combinations thereof. The phenomena are typically referred when measuring colours, luminescence such as fluorescence and phosphorescence, diffraction, plasmon effects and others.

A small focusing area of a few nm enables detection of a small number of tracers that may have small size. A narrow light beam with high intensity can be used in a focusing sensor system, e.g. a laser beam sensor system.

A small focusing area does however require high precision for accurate controlling of where on the processing result a focusing sensor is focusing.

With a dual axis set-up having for instance a fixed laser above or below a rotating cartridge, both the rotation of a rotating main disc holding the cartridge must be precisely controlled for hitting a target point with the laser beam. Even though a target point on a processing result is defined and the rotation of the discs are controlled accordingly, the actual target point may be slightly different from one cartridges to another due to different factors, e.g. different production tolerances of cartridges, different temperatures etc.

For achieving precise detection of properties of a processing result, it is thus vital to know the exact location of the focus point of a focusing sensor, e.g. where a laser beam is hitting the processing result. This actual focus point on the processing result may also be the starting point when scanning an area of a processing result.

Embodiments of the present invention introduce a method and apparatus for providing precise and very accurate control of the exact location of a focus point on a processing result for determining properties of the processing result by means of a focusing detector, and where a focusing detector is stationary while the processing result is in a cartridge spinning around its own axis as well as around a distal axis.

SUMMARY OF THE DISCLOSURE

Embodiments of the present invention are defined by a method and apparatus for controlling a position of a target point on a processing result relative to a focus point of a focusing sensor system for determining properties of the processing result which is located inside a cartridge.

The focusing sensor system is stationary at a set position relative to a disc rotatable about a first axis by a first motor connected to a controller. The cartridge is rotatable about a second axis by a second motor connected to a controller, and where the cartridge is smaller than the disc and placed in, and off-centre of the disc.

The method is defined by the following steps:
a) determining a point within the cartridge as an initial focus point of the focusing sensor system, where the initial focus point is a point (r, θ), where r is a fraction of the radii of the cartridge, and θ is the angle between a first reference point on the cartridge and the initial focus point;
b) controlling rotation of the cartridge and disc such that the focus point of the focusing sensor system corresponds to the initial focus point, by determining angular positions φ and Θ to be set for the cartridge and the disc such that the initial focus point of the focusing sensor system corresponds to the point (r, θ) within the cartridge, where angle Θ of the cartridge is determined relative to the first reference point on the cartridge, and angle co of the disc is determined relative to a second reference point on the disc;
c) checking whether the initial focus point of the focusing sensor system corresponds to the target point on the processing result by capturing images of the processing result in the cartridge and the initial focus point within the cartridge, and comparing (x, y) target positions in captured images with the initial focus point of the focusing sensor system, and adjusting rotation of the cartridge and disc such that the focus point of the focusing sensor system corresponds to the target point on the processing result, and
d) detecting and examining signals received from the focusing sensor system for determining properties of the processing result at the target point wherein an area of the processing result is scanned by rotating the disc and cartridge to angles φ and Θ such that the focusing sensor system focus on a point (r, θ) within the cartridge corresponding to the target point and properties of the processing result are iteratively detected by turning disc and cartridge in steps for covering the area.

Further features of the method are defined in the claims.

Apparatuses provided herein comprise a controller having means for determining rotation of the disc and cartridge and for controlling the first and second motors to rotate the disc and cartridge to angular positions φ, Θ such that the focus point of the stationary focusing sensor system corresponds to an initial defined focus point within the cartridge.

Apparatuses provided herein further comprise means for checking and controlling the focus point of the focusing sensor system such that is corresponds to the target point on the processing result, and a detector for detecting signals received from the focusing sensor system for examining and determining properties of the processing result at the target point.

Further features of the apparatus are defined in the claims.

BRIEF DESCRIPTION OF THE FIGURES

The present disclosure will be described in detail by reference to the following figures.

DETAILED DESCRIPTION OF THE DISCLOSURE

The present disclosure relates to centrifuge apparatuses for processing samples in cartridges. More specifically, the disclosure is defined by a method and apparatus for controlling a target point of a processing result relative to a focusing point of a focusing sensor system for determining properties of the processing result located inside a cartridge.

Different types of measuring principles can be used for examining and determining properties of a processing result, e.g. acoustics, magnetic, radioactive and light. A focusing sensor system according to the present disclosure can be of any type suitable for measuring properties of a processing result. Using two or more focusing sensors systems detecting different properties is also feasible.

Samples to be processed can be of any type. It may for instance be a fluidic or liquid sample, such as blood.

Prior to examining a processing result, a sample such as for instance a blood drop, is put in a cartridge and processed by controlling rotation speeds and orientation of the cartridge within the rotating disc. By altering the orientation of the cartridge relative to the centrifugal force, the sample and reagents are directed into different channels or microfluidic cavities in the cartridge. These channels and microfluidic cavities will typically also process different fluidic reagents reacting with the sample. After a centrifugation process of the sample, different processing results may be in different areas of a cartridge. There may be from one to several hundred spots to be analyzed with a focusing sensor system.

By examining processing results located in different areas of a cartridge, different properties of a sample can be established. The geometry of a cartridge and its internal cavities are normally known. Specific target points of the processing result to be examined can therefore be determined.

Figure 1:
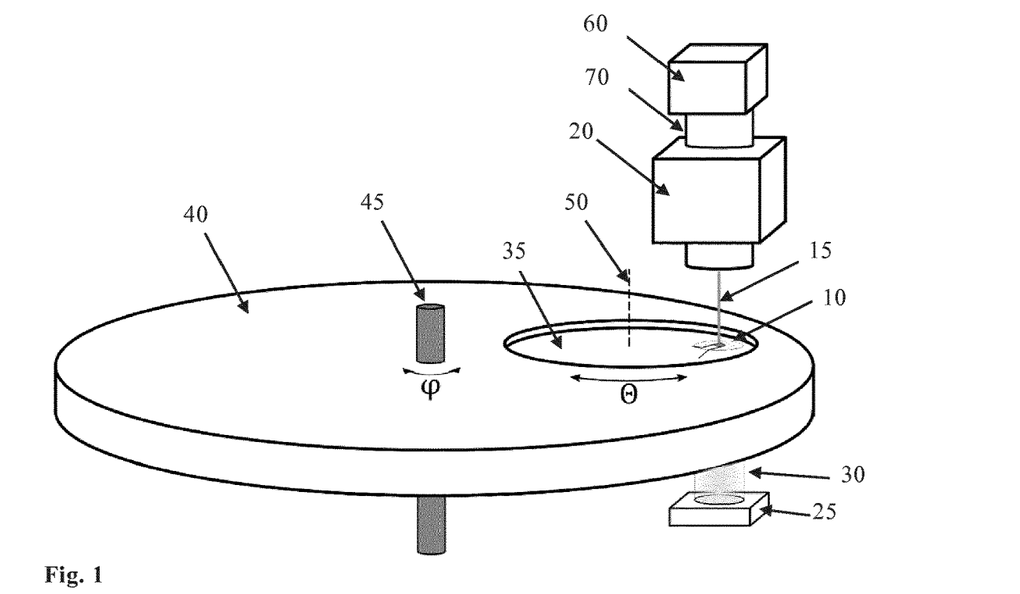
FIG. 1 shows an overview of main parts of a centrifugal apparatus comprising a main rotating disc holding a rotating cartridge, and means for controlling that a focusing sensor system, in this example comprising a light beam hits a processing result, according to some embodiments.

FIG. 1 shows an overview of the main parts of a centrifugal apparatus according to some embodiments. The apparatus comprises a disc 40 holding a cartridge 35. A focusing sensor system 20, in this example, a beam light source transmitting a beam light 15 is directed at the cartridge 35 comprising a processing result 10. The focusing sensor system 20 is stationary at a set position relative to the disc 40. The beam light source enables analysis of the processing result 10.

The disc 40 is rotatable about a first axis 45 by a first motor connected to a controller (not shown). The cartridge 35 is rotatable about a second axis 50 by a second motor connected to a controller (not shown). The cartridge 35 is smaller than the disc 40 and placed in and off-centre of the disc 40.

The controller comprises means for determining rotation of the disc 40 and cartridge 35, and for controlling the first and second motors to rotate the disc 40 and cartridge 35 to respective angular positions φ, Θ such that the focus point of the stationary focusing sensor system 20 corresponds to an initial defined focus point 55 within the cartridge 35.

The apparatus further comprises means for checking and controlling the focus point of the focusing sensor system 20 such that it corresponds to the target point on the processing result 10.

The apparatus further comprises a detector 60 for detecting signals received from the focusing sensor system 20 for examining and determining properties of the processing result 10 at the target point.

In some embodiments, the means for checking and controlling that the focus point of the focusing sensor system 20 focusing on the processing result 10 is a device for capturing images of the processing result 10 in the cartridge 35 and the focus point of the focusing sensor system 20. From the images, the geometry of the cartridge 35 can be visualized, and show where a processing result 10 is located within the cartridge 35.

In some embodiments, images are captured by a camera 70. A spread light source 25 may then be included in the apparatus for providing spread light 30 for illuminating the cartridge 35.

The spread light source 25 can be LED-light installed below the cartridge 35. By having the camera 70 mounted above the cartridge 35, pictures taken of the processing result 10 will be backlit. A light source can also be mounted on the same side of the cartridge 35 as the camera 70.

In some embodiments, the focusing sensor 20, detector 60 and camera 70 are all integrated in same structure located above the cartridge 35 and disc 40 as illustrated in FIG. 1. The focusing sensor source 20 and detector 60 can be a laser sensor system.

Pictures from the camera 70 enable visualization of the geometry of the cartridge 35 thereby enabling monitoring where on the cartridge 35 a processing result 10 is located. This can be used for fine tuning the rotation of the rotary disc 40 and cartridge 35 for precise positioning of the processing result in the cartridge 35 relative to the light beam 15.

The present disclosure also comprises a method for controlling a target point of a processing result 10 relative to a focus point of a focusing sensor system 20.

The purpose is to determine properties of the processing result 10 which is located inside the cartridge 35 described above.

According to some embodiments, the focusing sensor system 20 is placed stationary at a set position relative to a disc 40 rotatable about a first axis 45 by a first motor connected to a controller, and where the cartridge 35 is rotatable about a second axis 50 by a second motor connected to a controller, and where the cartridge 35 is smaller than the disc 40 and placed in and off-centre of the disc 40.

In the example shown in FIG. 1, where the focusing sensor system 20 is a beam light source, reflected light from the processing result 10 illuminated by the light beam 15 is examined for determining properties of the processing result 10. The processing result 10 may for instance be the final product of a chemical reaction, or a set of analytical beads obtained in an assay of a sample, performed in the fluid circuit.

Alternative and/or additional analysis and control systems are described in for instance WO 2011/081531 (p. 8 line 31-p. 10 line 23), which is incorporated here by reference.

Figure 2:
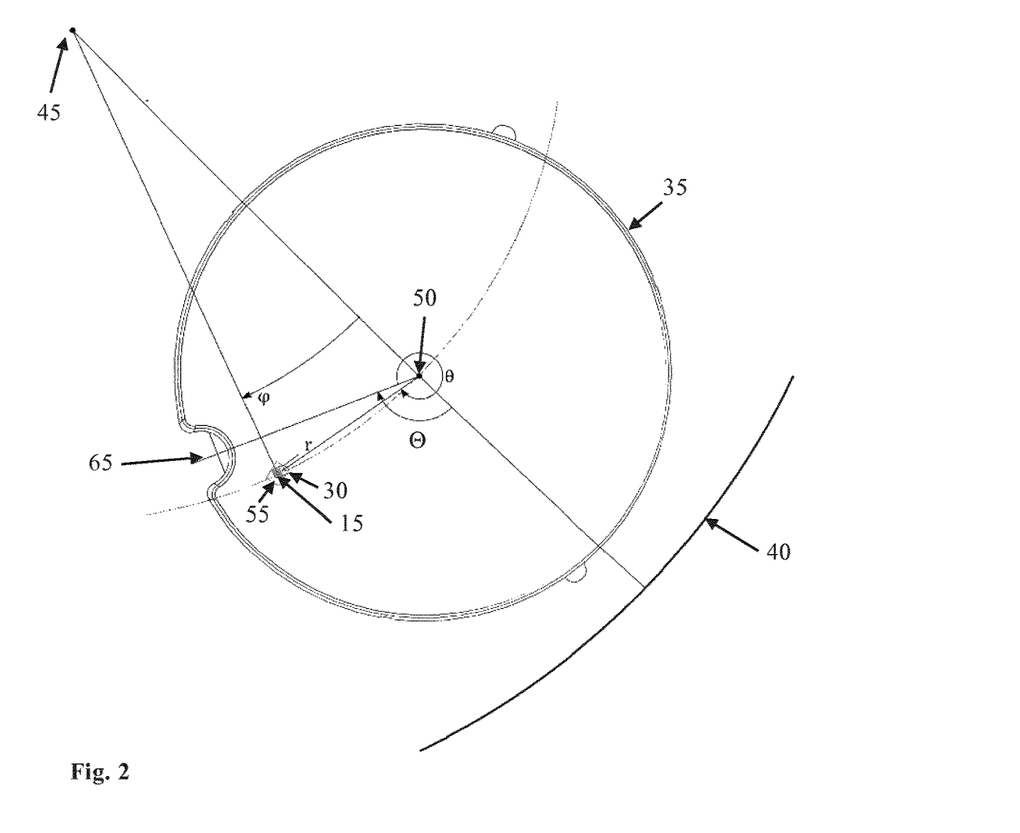
FIG. 2 shows an example of a cartridge and a defined focus point of a focusing sensor system, according to some embodiments.

FIG. 2 shows an example of a cartridge 35 with its internal geometry and a point defined as an initial focus point 55 for a light beam 15, i.e. the focusing sensor system 20. After undergoing centrifugation, a sample will be lead into different areas of the cartridge 35. For examining a specific processing result 10 of a sample, an area where the light beam 15 is to hit must be defined. The Figure also illustrates spread light 30 illumination the processing result.

Figure 3:
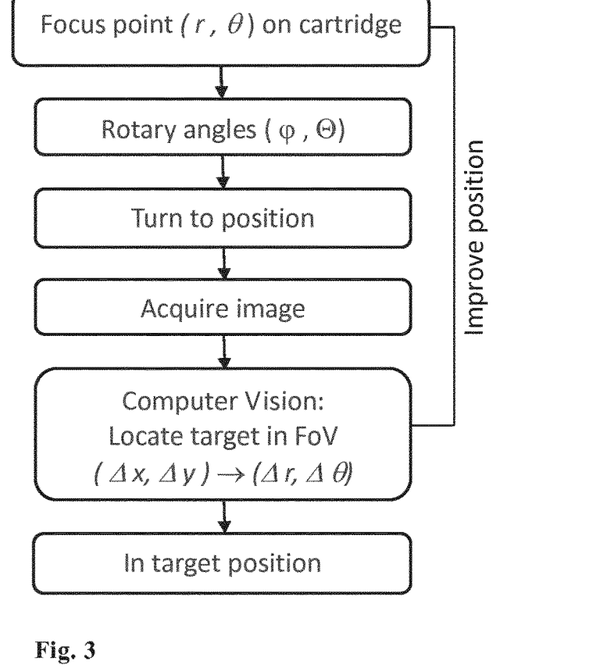
FIG. 3 is a flow chart showing an overview of the different steps involved for finding a target point for a processing result in a cartridge, according to some embodiments.

FIG. 3 shows an overview of the different steps involved in a method according to the disclosure for matching the focus of a focusing sensor system 20 with a target point on a processing result 10 in a cartridge 35.

In the following, different definitions for the terms point and spot are described. A target point is a fixed point on a processing result to be examined. The processing result 10 is located inside a cartridge 35. A focus point is the point where a focusing sensor system 20 currently is focusing. An initial focus point 55 is a point defined within the cartridge where the processing result 10 is believed to be located. As described above, the initial focus point 55 may or may not correspond to the target point.

The first step of the method is determining a point within the cartridge 35 as an initial focus point 55 of the focusing sensor system 20. In FIG. 3, this point is named as a hit point. This point is meant to represent a target point of the processing result 10 within the cartridge 35. Ideally the initial focus point 55 of a focusing sensor system 20 corresponds to the target point, meaning that if the light beam 15 strikes the initial focus point 55 on the cartridge 35 it will also hit the processing result 10 at the target point.

However, due to different aspects contributing to uncertainties, the initial focus point of a focusing sensor system 20 will not necessarily hit a target point of the processing result 10. Uncertainties can be introduced by production tolerances of cartridges 35, changing temperatures etc.

In some embodiments, the initial focus point 55 shown in FIG. 2 is defined by a point $(r, \theta)$, where r is a fraction of the radii of the cartridge 35, and $\theta$ is the angle between a first reference point 65 on the cartridge 35 and the initial focus point 55.

After determining the initial focus point 55, the next step is letting one or more controllers control motors to rotate the cartridge 35 and disc 40 such that that the focus point of the focusing sensor system 20 corresponds to the initial focus point 55.

In some embodiments, controlling of rotation of the cartridge 35 and disc 40 is performed by determining angular positions $\varphi$ and $\Theta$ to be set for the cartridge 35 and the disc 40 such that the initial focus point 55 of the focusing sensor system 20 corresponds to the point $(r, \theta)$ within the cartridge 35.

The angle $\Theta$ of the cartridge 35 is determined relative to the first reference point 65 on the cartridge 35, and angle $\varphi$ of the disc 40 is determined relative to a second reference point on the disc 40.

After the cartridge 35 and disc 40 have been turned to positions according to the angles $\varphi$ and $\Theta$, the focus of the focusing sensor system 20 will be on the point $(r, \theta)$ defined as the initial focus point 55 within the cartridge 35.

According to some embodiments, it is checked whether the initial focus point 55 of the focusing sensor system 20 corresponds to the target point on the processing result 10. If it does, a detector 60 is used for examining properties of the processing result 10 as that spot.

If the initial focus point 55 of the focusing sensor system 20 does not correspond to the target point on the processing result 10, an updated focus point is defined and the rotation of the cartridge 35 and disc 40 is adjusted until the focus point of the focusing sensor system 20 corresponds to the target point on the processing result 10. In some embodiments, this is performed by incremental rotation of the cartridge 35 and disc 40, then checking whether the focus point corresponds to the target point and repeating these steps until a focus point of the focusing sensor system 20 corresponds to the target point of a processing result 10.

An updated focus point can be acquired by keeping the angular position of the disk 40 fixed, while slightly changing the angular position of the cartridge 35. An updated focus point can also be acquired by keeping the angular position of the cartridge 35 fixed while slightly changing the angular position of the disc 40. Both the angular position of the cartridge 35 and the angular position of the disk 40 can be changed at the same time for establishing the updated focus point.

When it is confirmed that the focus point of the focusing sensor system 20 is focusing on the target point of the processing result, detection and examination of signals received from the focusing sensor system 20 is performed for determining properties of the processing result 10 at the target point.

Checking whether the initial focus point 55 of the focusing sensor system 20 corresponds to the target point on the processing result 10 can be performed by capturing images of the processing result 10 in the cartridge 35 and the initial focus point 55 within the cartridge, and defining $(x, y)$ positions in the resulting image. Based on this, the exact position of the initial focus point 55 of the focusing sensor system 20 relative to the target point of the processing result 10 can be found by comparing the $(x, y)$ target positions in a captured image with the position of the initial focus point 55 of the focusing sensor system 20.

The expression $(\Delta x, \Delta y) \rightarrow (\Delta r, \Delta \theta)$ in FIG. 3 means that a focus point $(r, \theta)$ on the cartridge 35 is repeatedly adjusted until it is confirmed that the focusing sensor 20 is focusing on a specific target point in the field of view (FoV) of the image.

Images of the processing result can be made by using different types of sensors and measuring principles, e.g. acoustic, magnetic, radioactive, X-ray etc.

In some embodiments, images of the processing result 10 are captured with a camera 70 based on detection of light. For improving exposure of images captured by the camera 70, the cartridge 35 may be illuminated by spread light 30 from a spread light source 25. In one embodiment, the spread light source 25 is positioned below the cartridge 35, and the camera 70 is positioned above the cartridge 35. The processing result 10 will then be backlit and pictures taken with the camera 70 will have high contrast and well-defined features. LED-light may be used as the spread light source 25.

In many cases it is of interest to scan an area of a processing result 10 for averaging reflected signals or integrating signals over an area greater than the area covered by a stationary focusing sensor 20. For doing this, the method described above can be repeated by systematically changing the angles $\varphi$ and $\theta$ of the disc 40 and cartridge 35 in incremental steps while acquiring signals from the detector 60.

Figure 4:
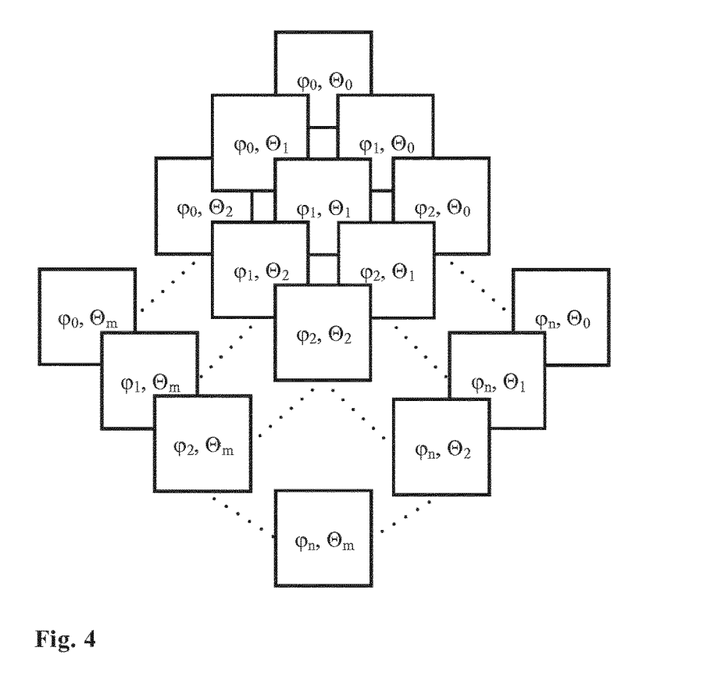
FIG. 4 shows a scan pattern using disc- and cartridge turns, according to some embodiments.

FIG. 4 shows a scan pattern that can be used for controlling disc- and cartridge 35 turns. For each position $\varphi 0 \Theta 0$ to t φn Θm an image is acquired, meaning that all images are acquired at slightly different rotational angels of the disc 40 and cartridge 35.

In some embodiments, this is used to create high resolution, high sensitivity images of signals from the processing result, which may be used for quantitative measurements of total signal by integration, analysis of spatial distribution, or measurement of multiple processing results distributed on the cartridge.

Figure 5:
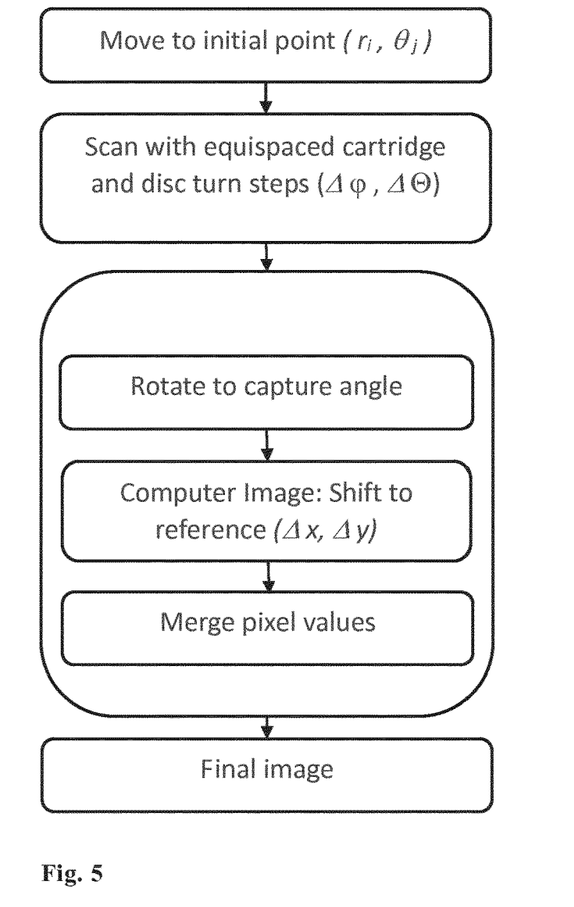
FIG. 5 is a flow chart showing the different steps involved for scanning an area using the dual-axis rotary apparatus, according to some embodiments.

FIG. 5 is a flow chart showing the different steps involved for scanning an area using the dual-axis rotary system according to some embodiments.

The method for scanning an area of a processing result 10 starts with the method described above by rotating the disc 40 and the cartridge 35 to angles φ and Θ such that the focusing sensor system 20 focus on a point (r, θ) within the cartridge 35 corresponding to the target point.

Properties of the processing result 10 is then iteratively detected by turning the disk 40 and cartridge 35 in equispaced steps (ri, θj) for covering the area of the processing result 10. In one embodiment, detection signals from an area is averaged or integrated.

In the following example, a focusing sensor system 20 based on a beam light source is used for illustrating how the methods and apparatuses according to the disclosure are enabled. According to some embodiments, the beam light source is a laser beam.

By using a beam light source as a focusing sensor 20, changes in light properties can be detected. Reflected or emitted light from luminescent materials in the processing result can also be detected and examined, thereby establishing a picture of the processing result which is the resulting product of a sample after being exposed to centrifugal forces making it interact with different reagents in a cartridge.

After processing a cartridge 35, a typical scenario is that different types of processing results may be located in different areas in the cartridge 35. For determining properties of processing results, a laser beam is directed at an initially defined focus point 55 within the cartridge 35. This will be a focus point where a processing result is expected to be located.

The disc 40 and cartridge 35 are then rotated such that the laser beam hits the initially defined focus point 55. It is then checked whether the focus point of the laser beam hits the processing result 10. This can be done by taking picture of the processing result and the hit point of the laser beam. By defining (x, y) positions for each pixel in a picture, the location of the processing result in the picture as well as the hit point of the laser beam is defined according to corresponding (x, y) positions of their pixels.

Said positions can be established based on computer vision analysing and understanding features in the picture. Pixel locations in an image is correlated with the area where the processing result 10 is located as well as pixel locations where the light beam 15 is hitting. In this way, each relevant pixel at (x, y) positions in an image where a processing result is located can be transformed to angular positions φ and θ, i.e. by means of computer vision the relation (Δx, Δy)→(Δφ, → Θ) is determined and the controller is controlling the motors spinning the disc 40 and cartridge 35 accordingly.

This method will give total and absolute control of the area of a processing result 10 that is hit by the laser beam thereby providing accurate detection of properties at the point the laser beam is hitting the processing result.

When scanning an area of a processing result, detected changes in light properties of the laser beam at each focusing/hit spot are acquired iteratively, i.e. changing $(r_i, \theta_j)$, by turning the disk 40 and cartridge 35 in equispaced steps for covering an area of the processing result 10.

The described method provides a very accurate control of the scanning process of a processing result 10. Accurate position of cartridge 35 and disc 40 is required for merging signals detected from each spot on a processing result 10 hit by the laser beam, thus making the basis for integration of a complete signal of a processing result. When an area of a processing result 10 has been scanned, the resulting images of the reflected light beam 15 are merged for establishing a complete picture of an area.

Figure 6A:
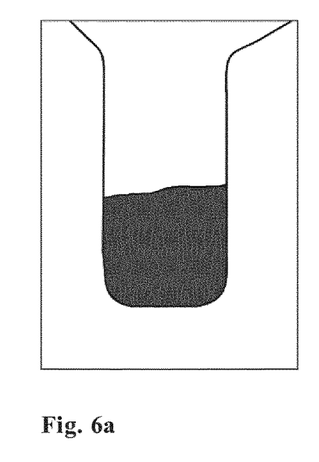
FIG. 6a is an illustration of light reflected from a processing result by using LED light, according to some embodiments.

FIG. 6a is an illustration of a processing result 10 captured by a camera by using LED light as the spread light source 25. The image shows an area of a processing result 10 to be scanned by using a light beam 15.

Figure 6B:
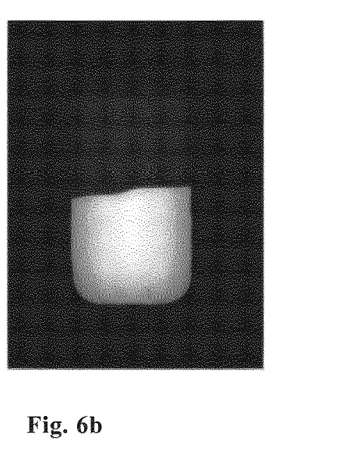
FIG. 6b is an illustration of light reflected from a processing result by using laser light, according to some embodiments.

FIG. 6b is an illustration of the result after scanning the area with a light beam 15. Each pixel value is merged together for establishing a complete image captured from light reflected from a processing result 10 by using laser light.

Figure 7:
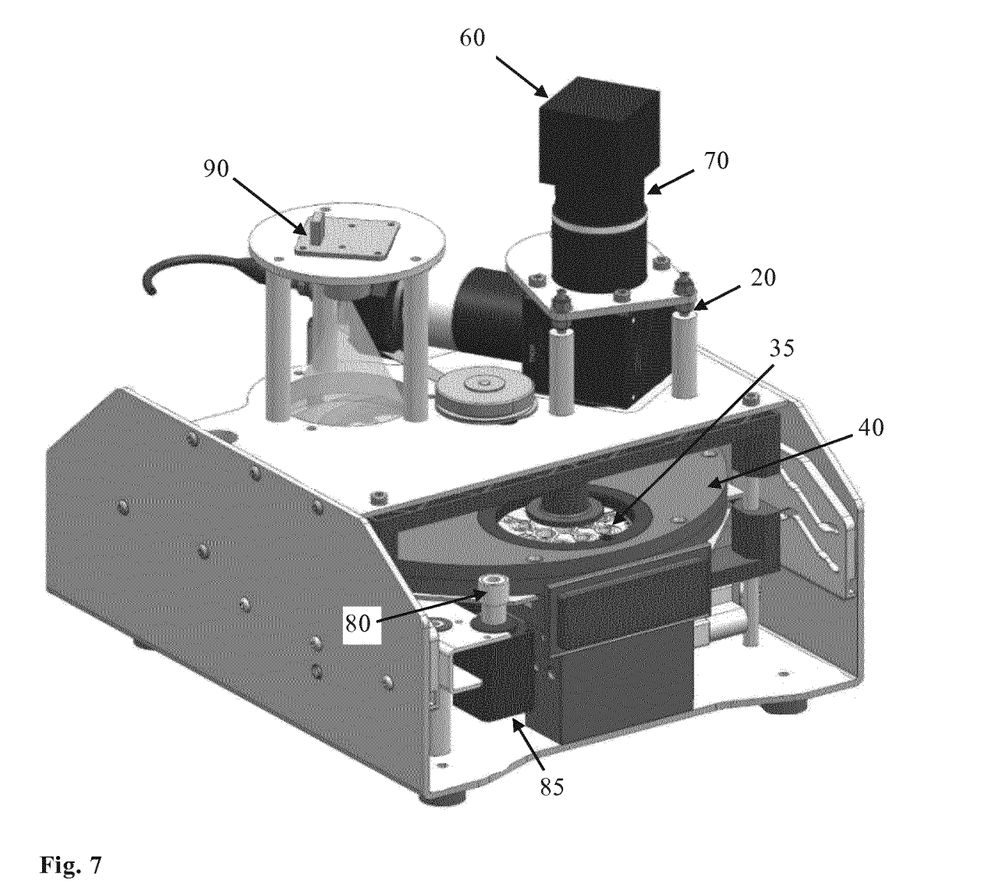
FIG. 7 shows a perspective view of a centrifuge apparatus, according to some embodiments.

As described, the apparatus comprises motors for spinning the cartridge 35 and disc 40. In some embodiments, the apparatus further comprises an activation device 85 as shown in FIG. 7. This is connected to a controller and engagement means 80 for controllable engagement with the disc 40.

FIG. 7 shows a perspective view of some embodiments of the centrifuge apparatus comprising the activation device 85. In some embodiments, a separate controllable activation device 85 is connected to the engagement means 80 for providing controllable engagement with the disc 40. The purpose is to improve angular stability of the disc 40. The reason for this is that the stability of the disc 40 provided when the first motor stand still is not always sufficient for performing accurate measurements.

If the engagement means 80 is needed, the activation device 85 will be activated and controlled letting the engagement means 80 engage with the edge of the disc 40.

The part of the engagement means 80 in contact with the disc 40 is in one embodiment a shaft or a circular finger extending from the activation device 85. The shaft or finger is preferable provided with a friction layer such as rubber for providing good grip on the disc 40. In addition to engagement with the disc 40, the shaft or finger may also provide fine-tuning of the angular position of the disc 40 in either direction from an initial engagement point.

In some embodiments, the shaft or circular finger is rotatable. In some embodiments, the activation device 85 can be activated for rotating the disc 40 to a set position and keeping the disc 40 stationary when loading or unloading a cartridge.

FIG. 7 shows a centrifuge apparatus further comprising a first optical analysis and control system 90 comprising a strobe light source and a camera directed at the rotary disc 40 and the cartridge 35. This is used for monitoring and controlling the centrifugal process for directing various reagents, samples, analytical beads, solvents etc. in the fluid circuit of a cartridge 35.

The present disclosure introduces a method and apparatus for precise and absolute control of a target point on a processing result 10 relative to a focus point of a stationary focusing sensor system 20 for determining properties of the processing result 10 which is located inside a rotating cartridge 35 located in and off-centre of a rotating disc 40.

The invention claimed is:

1. An apparatus for controlling a position of a target point of a processing result relative to a focus point of a focusing sensor system for determining properties of the processing result comprising:
a focusing sensor system;
a rotating disc holding a rotating cartridge comprising the processing result;
a controller comprising means for determining rotation of the disc and the cartridge and controlling a first motor and a second motor configured to rotate the disc and cartridge to respective angular positions φ, Θ such that the focus point of the focusing sensor system corresponds to an initially defined focus point within the cartridge;
wherein the focusing sensor system is stationary at a set position relative to the disc rotatable about a first axis by the first motor connected to the controller, the cartridge is rotatable about a second axis by the second motor connected to the controller, and the cartridge is smaller than the disc and placed in and off center of the disc;
a device for capturing images of the processing result in the cartridge and the focus point of the focusing sensor system and where the controller comprises means for checking and controlling the focus point of the focusing sensor system such that the focus point corresponds to the target point on the processing result by capturing images of the processing result in the cartridge and the initial focus point within the cartridge, and comparing target positions in captured images with the initial focus point of the focusing sensor system, and adjusting rotation of the cartridge and disc such that the focus point of the focusing sensor system corresponds to the target point on the processing result; and
a detector controlled to iteratively detect properties of the processing result by detecting signals received from the focusing sensor system when the disc and cartridge are controlled to turn in equispaced steps from the target point for covering an area of the processing result.

2. The apparatus of claim 1, comprising a light source providing spread light for illuminating the cartridge.

3. The apparatus of claim 2, wherein the light source is positioned below the cartridge, and the device for capturing images is positioned above the cartridge.

4. The apparatus of claim 1, wherein the focusing sensor system is a focusing laser sensor system.

5. The apparatus of claim 1, wherein the focusing sensor system, the detector, and the device for capturing images are integrated in a single structure.

6. The apparatus of claim 1, comprising an activation device connected to an engagement means and the controller providing controllable engagement with the disc.

7. The apparatus of claim 1, further comprising a first optical analysis and control system comprising a strobe light and the device for capturing images directed at the disc and the cartridge, and configured to monitor and control a centrifugal process for directing various samples in a fluid circuit of a cartridge.

* * * * *